US008358878B2

(12) United States Patent
Weston

(10) Patent No.: US 8,358,878 B2
(45) Date of Patent: Jan. 22, 2013

(54) METHOD AND APPARATUS FOR INTERPOLATING AN IMAGE

(75) Inventor: Martin Weston, Petersfield (GB)

(73) Assignee: Snell Limited, Havant (GB)

( * ) Notice: Subject to any disclaimer, the term of this patent is extended or adjusted under 35 U.S.C. 154(b) by 898 days.

(21) Appl. No.: 12/375,543

(22) PCT Filed: Sep. 18, 2007

(86) PCT No.: PCT/GB2007/003546
§ 371 (c)(1),
(2), (4) Date: May 19, 2009

(87) PCT Pub. No.: WO2008/035063
PCT Pub. Date: Mar. 27, 2008

(65) Prior Publication Data
US 2009/0263033 A1    Oct. 22, 2009

(30) Foreign Application Priority Data

Sep. 18, 2006 (GB) .................................. 0618323.0

(51) Int. Cl.
*G06K 9/32* (2006.01)
(52) U.S. Cl. .... 382/300; 348/441; 348/459; 375/240.01; 375/240.15; 375/240.16; 375/240.27; 382/236
(58) Field of Classification Search ........................ None
See application file for complete search history.

(56) References Cited

U.S. PATENT DOCUMENTS

| | | | |
|---|---|---|---|
| 6,480,632 B2 | 11/2002 | Martins et al. | |
| 6,625,333 B1* | 9/2003 | Wang et al. | 382/300 |
| 6,704,357 B1* | 3/2004 | Ketcham | 375/240.01 |
| 7,039,109 B2 | 5/2006 | Pelagotti et al. | |
| 7,336,838 B2 | 2/2008 | Hur et al. | |
| 7,343,044 B2* | 3/2008 | Baba et al. | 382/236 |
| 7,548,664 B2* | 6/2009 | Souchard | 382/300 |

(Continued)

FOREIGN PATENT DOCUMENTS

| | | |
|---|---|---|
| JP | 63209284 | 8/1988 |
| JP | 8275116 | 10/1996 |

(Continued)

OTHER PUBLICATIONS

Krishnamurthy, Ravi, et al.; "Frame Interpolation and Bidirectional Prediction of Video Using Compactly Encoded Optical-Flow Fields and Label Fields", IEEE Transactions on Circuits and Systems for Video Technology, vol. 9, No. 5, pp. 713-726, Aug. 1999.

(Continued)

*Primary Examiner* — Tsung-Yin Tsai
(74) *Attorney, Agent, or Firm* — Michael Best & Friedrich LLP

(57) ABSTRACT

This invention concerns the interpolation of new intermediate images within an existing set of related images, for example views of a scene captured at different times, such as a sequence of film frames or video fields, or views of a scene captured from different camera positions, either simultaneously or in a time sequence. Motion vectors established for pixels or regions in at least one existing image are used to shift those pixels or regions to the output position of the new image. The shifted pixels or regions are combined in dependence on a probability of accuracy measure for the respective motion vector. The probability of accuracy measure may be formed from displaced-field difference measurements. The occlusion of objects is determined and used in forming the probability of accuracy measure.

32 Claims, 10 Drawing Sheets

U.S. PATENT DOCUMENTS

| | | | |
|---|---|---|---|
| 7,742,529 B1 * | 6/2010 | Ghanbari | 375/240.27 |
| 2004/0240551 A1 * | 12/2004 | Itoh et al. | 375/240.16 |
| 2004/0246374 A1 * | 12/2004 | Mishima et al. | 348/441 |
| 2005/0157792 A1 | 7/2005 | Baba et al. | |
| 2005/0265451 A1 * | 12/2005 | Shi et al. | 375/240.15 |
| 2006/0017843 A1 * | 1/2006 | Shi et al. | 348/441 |
| 2006/0018383 A1 * | 1/2006 | Shi et al. | 375/240.16 |
| 2008/0240241 A1 * | 10/2008 | Mishima et al. | 375/240.15 |
| 2009/0129688 A1 * | 5/2009 | Baba et al. | 382/236 |
| 2010/0141832 A1 * | 6/2010 | Niu et al. | 348/459 |
| 2011/0141349 A1 * | 6/2011 | Albuz et al. | 348/441 |
| 2011/0310295 A1 * | 12/2011 | Chen et al. | 348/441 |

FOREIGN PATENT DOCUMENTS

| | | |
|---|---|---|
| JP | 2004320279 | 11/2004 |
| JP | 2006270823 | 10/2006 |
| WO | 92/05662 | 4/1992 |
| WO | 94/01970 | 1/1994 |
| WO | 02/056589 | 7/2002 |
| WO | 2004/025958 | 3/2004 |
| WO | 2006061421 | 6/2006 |

OTHER PUBLICATIONS

PCT/GB2007/003546 International Preliminary Report on Patentability, 10 pages, Dated Apr. 2, 2009.

PCT/GB2007/003546 International Search Report, 5 pages, Dated Jun. 25, 2008.

Office Action from the Japan Patent Office for Application No. 2009-527898 dated Jan. 25, 2012 (Translation and Original, 8 pages).

* cited by examiner

METHOD AND APPARATUS FOR INTERPOLATING AN IMAGE

CROSS-REFERENCE TO RELATED APPLICATIONS

This patent application is a national stage filing under 35 U.S.C. 371 of International Application No. PCT/GB2007/003546, filed Sep. 18, 2007, which claims foreign priority to Great Britain Patent Application No. 0618323.0, filed Sep. 18, 2006, the disclosures of which are incorporated by reference herein in their entireties. Priority to each application is hereby claimed.

FIELD OF INVENTION

This invention concerns the interpolation of new intermediate images within an existing set of related images. Examples of sets of related images include: views of a scene captured at different times, such as a sequence of film frames or video fields; and, views of a scene captured from different camera positions, either simultaneously or in a time sequence. The interpolated images could be used to improve the portrayal of motion when the sequence is displayed, or to obtain views from positions other than those of the original cameras or imaging devices. Another application is television frame rate conversion.

BACKGROUND OF THE INVENTION

A well known method of interpolation of intermediate images in a sequence is the use of "motion compensation" in which the changes in position of image features from one image to another are analysed and represented as two dimensional "motion vectors". Typically a vector is associated with a region in an image and the vector describes the direction and magnitude of the change in position of image features within that region from one image in the sequence to another. Interpolated images are then created by taking weighted sums of information from more than one image in the sequence; and, regions of the pictures are moved in dependence upon relevant motion vectors before the summation so as to avoid multiple images due to motion or change of viewpoint.

Although the terms "motion" and "motion vector" are used in this specification it must be appreciated that these terms are intended to relate to differences in position of features in a sequence of images and these difference may not necessarily be due to motion, they could equally be due to changes of viewpoint, or other sources of difference between images in a sequence of images.

A region may include more than one visible object and it is not unusual for more than one motion vector to be created for the same image region. The phase correlation method of motion vector creation is particularly able to identify a number of motion vectors within the same picture region. The process of motion-compensated interpolation is made more difficult when objects occlude one another and new features are revealed, or previously-visible features are concealed, as the image sequence proceeds.

Where several vectors are identified in a particular picture region it is often necessary to make a decision as to which vector to apply to each pixel in that region. For example, several prior art systems choose one of the applicable motion vectors to determine read or write storage addresses for input pixels, and an inappropriate choice may lead to severe problems. Because motion compensated interpolation involves changing the positions of features in the image in response to measured motion vectors, errors in the motion measurement can lead to highly visible artefacts; these can include unnatural hard edges to image features.

SUMMARY OF THE INVENTION

The inventor has appreciated that there is a novel method of image interpolation which avoids the need to make hard and fast decisions on the application of motion vectors to pixels and therefore gives "smoother" and more visually pleasing interpolation, particularly if the motion measurement system is unable to provide reliable vectors.

The invention consists in a method and apparatus for interpolating a new image within an existing sequence of related images using motion vectors applicable to pixels of an image in the said existing sequence, where the pixels of at least one existing image adjacent to the new image contribute to the new image, and the positions of the said contributions in the new image depend on scaled motion vectors applicable to respective contributing pixels, characterised in that:

two or more motion vectors are derived for a region of an existing image comprising at least two pixels; the derived vectors are used to create respective shifted versions of the said existing image region; and, the shifted regions are combined in a weighted sum to form a new image where the weight depends on a probability of accuracy measure for the respective vector that depends on a comparison of existing images.

In one embodiment a pixel from an existing image can contribute to two or more positions in the new image; and, the weight of each said contribution depends on a probability of accuracy measure associated with the contributing pixel and the respective vector that is scaled to determine the position of the respective contribution; and, the said probability of accuracy measure is derived from one or more displaced-field differences between the contributing existing image and one or more adjacent existing images.

In one embodiment the said probability of accuracy measure is a smooth function of a filtered displaced-field difference.

Suitably the said filter forms a weighted sum of a rectified displaced-field difference and an amplitude-limited, spatially low-pass filtered, rectified displaced-field difference.

In one embodiment the said smooth function is a negative exponential.

The new image may be interpolated from a normalised weighted sum of contributions from the image preceding the new image location and a normalised weighted sum of contributions from the image succeeding the new image location and the two said weighted sums combined in proportion to the proximity of the new image location to the preceding and succeeding images respectively.

The said proportion for an interpolated new image pixel may be modified in dependence on the total probabilities of vectors applicable to contributions to that pixel from the preceding existing image and the total probabilities of vectors applicable to contributions to that pixel from the succeeding existing image.

In a further embodiment at least two probability of accuracy measures are derived for a contribution: a first measure describing the probability that the respective contributing pixel is newly revealed in the existing image sequence; and, and a second measure describing the probability that the respective contributing pixel is about to be concealed in the existing image sequence.

The total probability of the contributions from the preceding existing field to a new image pixel may be evaluated and the contribution of about-to-be-concealed pixels is reduced so that the said total does not exceed a threshold.

The total probability of the contributions from the succeeding existing field to a new image pixel may be evaluated and the contribution of newly-revealed pixels is reduced so that the said total does not exceed a threshold.

BRIEF DESCRIPTION OF THE DRAWINGS

An example of the invention will now be described with reference to the drawings in which.

DETAILED DESCRIPTION OF THE INVENTION

Figure 1:
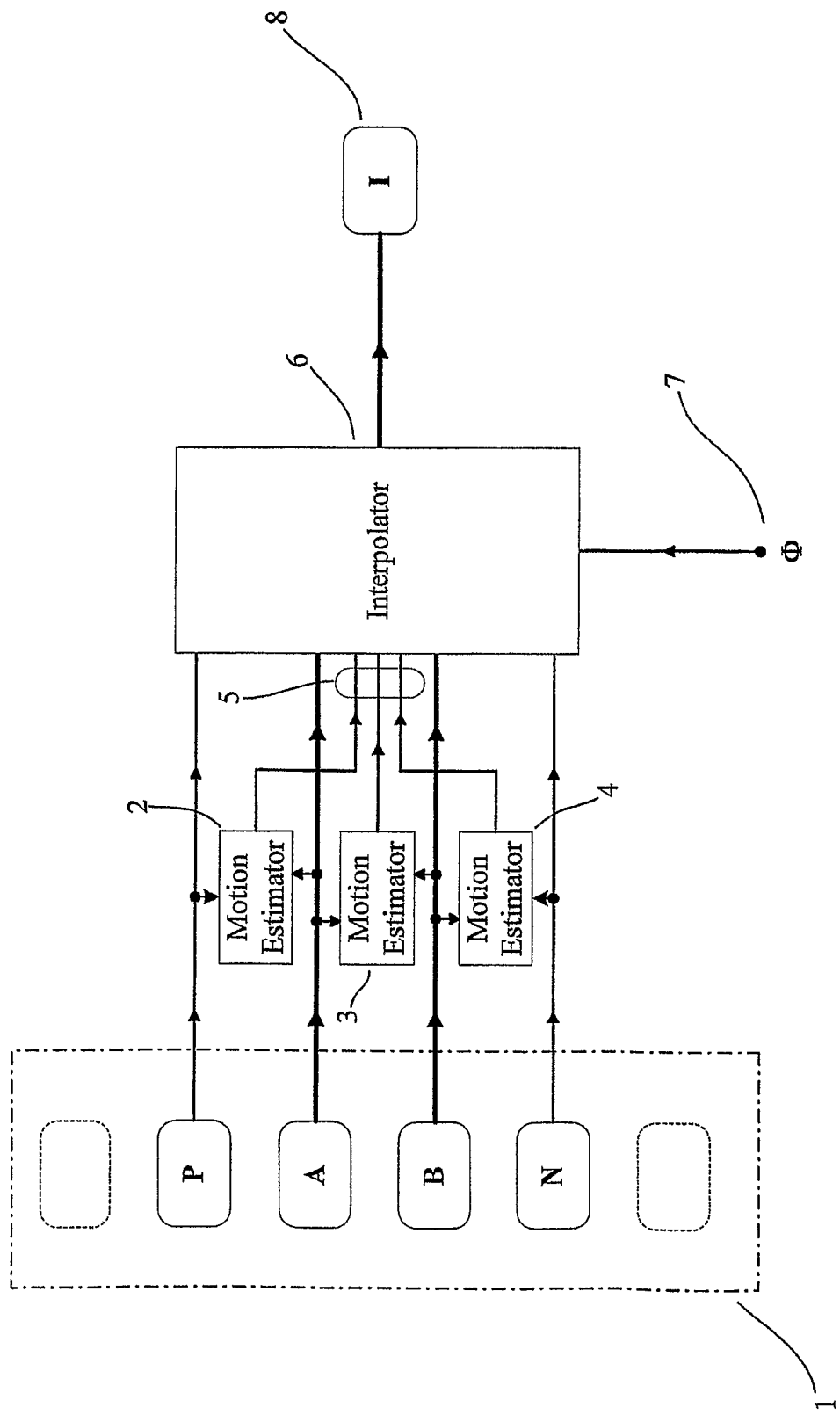
FIG. 1 shows an image interpolation system.

Referring to FIG. 1, a new image I (8) is to be created within a given sequence of input images (1). In the description which follows these images will be referred to as "fields", as would be the case for the temporal interpolation of interlaced television, however, as will be apparent to the skilled person, the method may be applied to image sequences in general.

The new field is to be created between input fields A and B. It will be created at some "position" (for example, time or viewpoint) between these two existing images; this position is assumed to be known and will be described by an "interpolation phase" value Φ; if this value is near zero the new image will be close to, and therefore almost identical to, A; and, if it is near unity the new image will be close to, and therefore almost identical to, B.

Two other fields from the input sequence (1) are also used: the field P, previous to A; and, the field N, next after B. Fields A and B are compared with their respective adjacent fields in motion estimators (2), (3) and (4), which output motion vectors (5). Each motion estimator may output one or more motion vectors and each vector will be associated with some region of the image. Typically a vector is either applicable to a "block" of pixels or is a "global" vector applicable to the whole image area. (In prior-art systems these vectors are sometimes referred to as 'trial vectors' or 'unassigned vectors'.)

The motion estimators (2) (3) (4) may use any of the known motion measurement methods, including, for example, phase correlation or block matching. Although three separate motion estimators are shown, it will usually be more convenient to use a single motion estimator which measures each pair of fields in turn. It is also possible to simplify the system by omitting motion estimators (2) and (4) and using only the vectors measured between Fields A and B from the motion estimator (3).

An interpolator (6) creates the new field I (8) from: the input fields A and B; the motion vectors (5); and the interpolation phase value Φ (7).

Very often objects in an image will occlude one another and this occlusion will change as the sequence of images progresses. The handling of occlusions is made possible by supplying information from Fields P and N to the interpolator (6). In regions which are revealed as the sequence progresses appropriate "forward" vectors can be identified from comparison with a later field; whereas in regions which are concealed as the sequence progresses "backward" vectors can be identified by comparison with an earlier field. Therefore the interpolator (6) uses comparisons between Fields P, A, B and N to select appropriate motion vectors from its input vectors (5) and apply them to different portions of the input fields.

Figure 2:
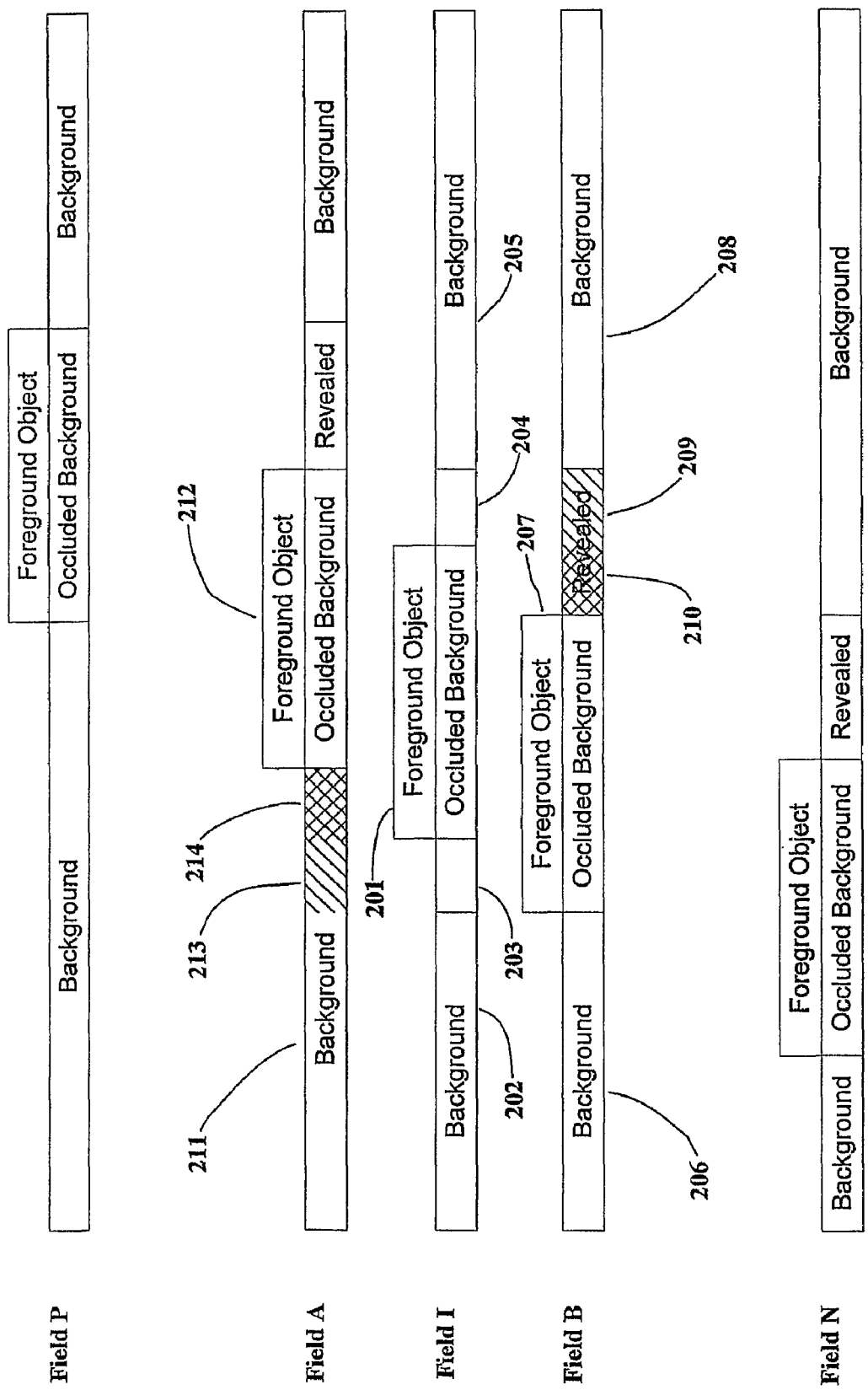
FIG. 2 shows a representation of the problem of motion compensation in the presence of occlusion.

This is illustrated in FIG. 2 in which the sequence of images is represented vertically, and the motion of an object is represented horizontally. (Note that the shading of parts of Fields A and B in the Figure is not relevant to the present discussion but will be referred to later.) In the Figure a foreground object moves from right to left across a background area as the sequence of input images P, A, B and N progresses. For simplicity the background is assumed to be stationary, but this need not be the case.

The new field I, is to be constructed from Fields A and B, and it comprises five different portions:

The foreground object (201), which is present in Fields A and B, but in different places.
  This can be interpolated from Fields A and B making use of motion vectors derived from a comparison of Fields A and B.
A background portion (202), which is present in Fields A and B.
  This can also be interpolated from Fields A and B making use of motion vectors derived from a comparison of Fields A and B.
A soon-to-be-concealed background portion (203), which is present in Field A but not in Field B.
  Field B cannot be used to construct this portion, but Field A can be used.
  If there is motion, vectors derived from a comparison of Fields P and A are likely to be relevant.
A revealed background portion (204), which is present in Field B but not in Field A.
  Field A cannot be used to construct this portion, but Field B can be used.
  If there is motion, vectors derived from a comparison of Fields B and N are likely to be relevant.
A background portion (205), which is present in Fields A and B.
  This can be interpolated from Fields A and B making use of motion vectors derived from a comparison of Fields A and B.

It can be seen that the construction of the new field I requires the selection of appropriate motion vectors from three different inter-field comparisons and that it is not always helpful to use both fields A and B in the interpolation.

Figure 3:
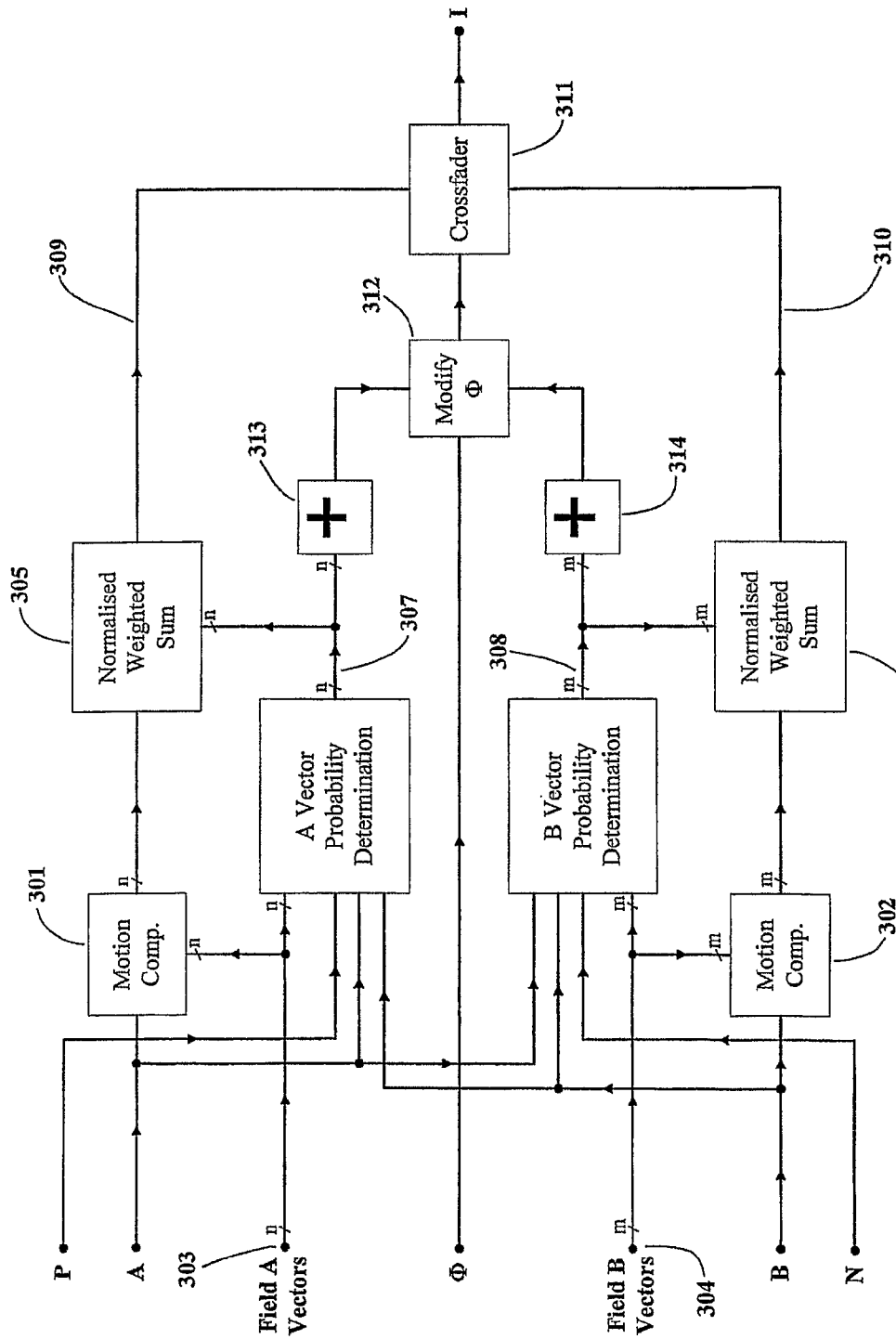
FIG. 3 shows an example of an image interpolator according to the invention.

FIG. 3 shows an image interpolation system in accordance with an embodiment of the invention. This system achieves superior interpolation by making the choice of vectors and interpolation weighting factors on a probabilistic basis which minimises the effect of errors and inaccuracies in the motion measurement process.

Referring to FIG. 3, input field A is input to a motion compensator (301) and input field B is input to second motion compensator (302). The blocks (301) and (302) each represent a parallel set of image shifters operating on the respective field input to generate a set of shifted versions of the respective field input in response to respective sets of motion vectors (303) and (304). The set of n vectors (303) comprises vectors relating to Field A; i.e. vectors derived from motion measurement between fields A and B, and may also include vectors derived from motion measurement between fields A and P. As mentioned previously there may be any convenient number of vectors n in the set of vectors (303), and defined picture regions may have one or more associated vectors. Similarly the set of m vectors (304) relates to Field B and its constituent vectors are derived from motion measurement between fields B and A and also may include vectors derived from motion measurement between fields B and N.

The constituent image shifters of the motion compensators (301) and (302) shift their respective input fields to their expected positions in the new field I in dependence upon their respective input motion vectors. This requires that the vector magnitudes are scaled in proportion to $\Phi$, in the case of the motion compensator (301), and in proportion to $(1-\Phi)$ in the case of the motion compensator (302).

The n shifted versions of field A are input to a normalised, weighted summation block (305), which also receives a set of n motion vector probability signals (307). The derivation of these signals is described below; however, each of the n vectors (303) has an associated probability signal. Each probability signal indicates, for all the pixels of the interpolated image I, the probability that its respective vector is appropriate for shifting a Field A pixel to construct the respective interpolated output pixel in Field I. The individual probability signals can conveniently be handled as video signals which are "white" in picture regions where there is 100% probability that the associated vector is applicable and "black" where there is zero probability, with intermediate values being represented by shades of grey.

The block (305) weights each of the n shifted outputs from the block (301) according to a respective one of the n motion vector probability signals (307) and forms a normalised sum of the results to give a single, shifted Field A signal (309). In this context "normalisation" means that the vector probabilities are scaled so that the sum of the probabilities applicable to any pixel is unity. This may be achieved by summing the probabilities and dividing each probability by the result. The effect of this normalisation is to ensure that the weighted sum video signal (309) has the same amplitude as the input Field A signal.

A shifted Field B signal (310) is made in a similar way by the block (306) from the m outputs of the motion compensator (302), making use of vector probabilities derived from the vectors applicable to Field B (304). As illustrated in FIG. 3, the determination of the vector probability signals (307) and (308) involves use of the video signals from adjacent fields, and this will be described in detail below.

The interpolated output field I is generated by a cross-fader (311), which fades between the shifted field signals (309) and (310). The cross-fader (311) is controlled by a modified version of the interpolation phase signal $\Phi$. The modification is carried out in the block (312), which is controlled by the sum, for a particular pixel, of the Field A vector probabilities (307), derived by the adder (313), and the sum of the Field B vector probabilities (308) for that pixel, derived by the adder (314). The interpolation phase is weighted by the ratio of the two summations so that if the total Field A probability exceeds the total Field B probability, the proportion of Field A in the crossfade for that pixel is increased; and, vice versa.

The determination of the sets of vector probability values (307) and (308) from the respective sets of vectors (303) and (304) and the input fields P, A, B and N will now be described with reference to FIG. 4. As explained previously the vectors describe the results of motion measurement between pairs of fields in the sequence of existing fields. The probabilities are derived from displaced-field difference signals (DFDs). Each vector is used to shift (displace) the pixels to which it applies in one of the fields, and the resulting displaced field (or region within a field if the relevant vector is only applicable to a specific region) is subtracted from the other field (or relevant region of the other field) of the pair to give a DFD. The magnitude of the DFD at a pixel in the image will give an indication of the validity of the relevant vector at that pixel; if the motion vector is correct the difference signal will be small.

Figure 4:
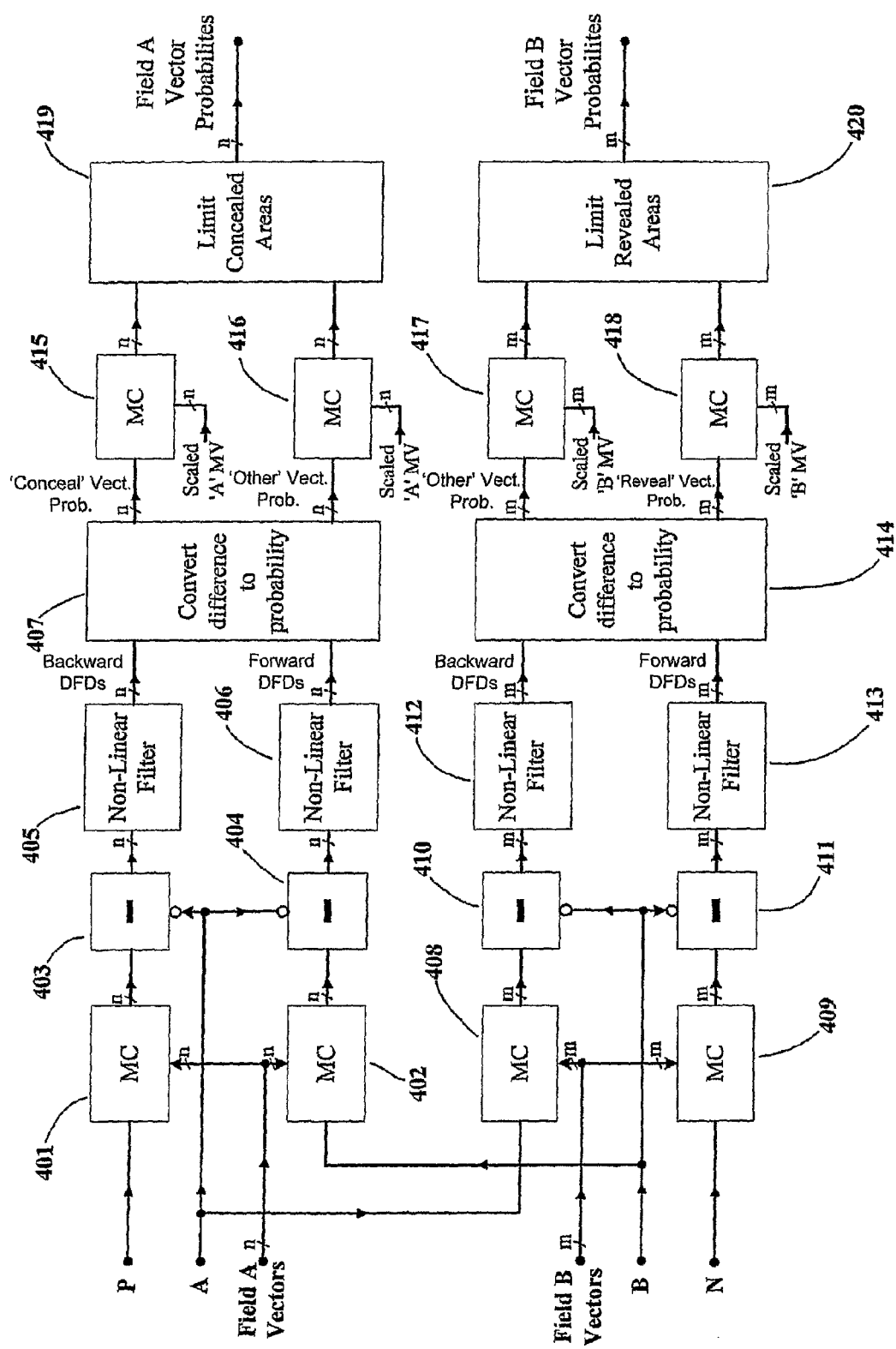
FIG. 4 shows the determination of motion vector probability information.

Referring to FIG. 4, the n vectors relative to Field A are applied to two motion compensators (401) and (402), each motion compensator comprising a set of n image shifters, one image shifter per vector. In the block (401) each of the vectors is used to shift Field P towards Field A; and, in the block (402), each of the vectors is used to shift Field B towards Field A. In each case a set of n displaced-field differences (DFDs) is made by subtracting Field A from the relevant shifted field. The set of n subtractors (403) produce "backward" DFDs for each of the set of n Field A vectors, and the set of n subtractors (404) produce "forward" DFDs for each of the n vectors.

The two DFDs resulting from each vector are non-linearly filtered in the blocks (405) and (406) to reduce the effect of false matches; these may be due a lack of image detail, or zero crossings between positive and negative difference values. A low-value DFD for a single pixel is no guarantee that the motion vector used to make the DFD is an accurate representation of the motion between the relevant fields; however a high-value DFD gives reliable evidence of an incorrect vector. A more reliable result for a particular pixel can be obtained by using other, neighbouring pixels in the vector assessment process; these neighbouring pixels can be incorporated by including them within the aperture of a spatial filer, centred on the pixel of interest. A suitable filter is shown in FIG. 5 and is suitable for the blocks (405) and (406) of FIG. 4.

Figure 5:
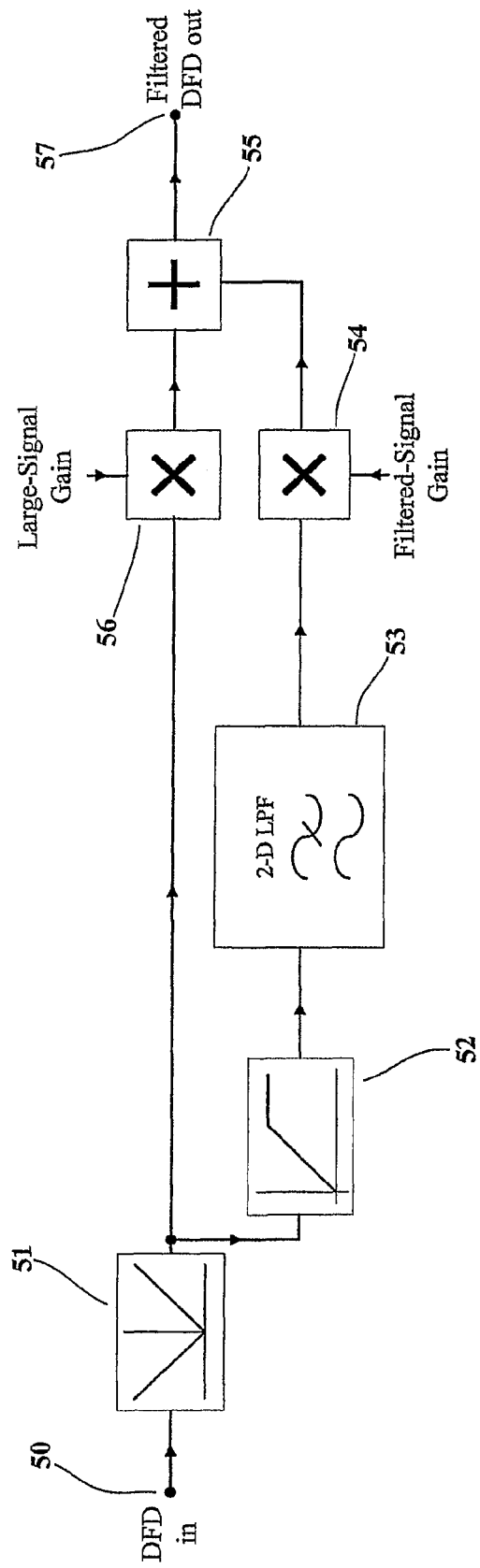
FIG. 5 shows a non-linear filter for displaced-field difference signals.

Referring to FIG. 5, an input DFD signal (50) is rectified in a rectifier (51) and the resulting magnitude signal is input to a limiter (52) which has unity gain for small signals but gives a fixed output for all inputs above a limiting value. This is done because once a DFD for a pixel exceeds the value due to noise it indicates that there is no match between the pixels being evaluated (i.e. the motion vector is not valid) and no further information is given by higher difference values.

The output from the limiter (52) is input to a two-dimensional spatial low-pass filter (53) which combines all the pixels within its aperture in a weighted sum. The aperture comprises a number of pixels surrounding the input pixel (and preferably excludes the input pixel). The gain of the output from the filter (53) is adjusted by a fixed multiplier (54) and combined in an adder (55) with the unfiltered output of the limiter (51), which has had its gain adjusted in a second fixed multiplier (56). The output of the adder (55) provides a filtered DFD output (57). The ratio of the gains of the multipliers (54) and (56) is chosen to give substantially equal contributions from a DFD pixel (not subject to limiting by the limiter (52)) at the two inputs of the adder (55).

The filtered output (57) gives a DFD which is less likely to indicate false matches, because it uses neighbouring pixels, but also maintains good spatial frequency response, because an unfiltered path contributes to the output.

A further improvement is possible by scaling the DFDs as a function of the local signal gradient prior to filtering; this reduces the possibility of false differences.

Returning to FIG. 4 the two sets of filtered DFDs from the blocks (405) and (406) are converted to two sets of vector probability signals by a difference to probability conversion block (407). (This will be fully described below with reference to FIG. 6). Where an input DFD value, for a particular pixel and corresponding to a particular motion vector, is large it is unlikely that that motion vector is appropriate for that pixel, and so its probability of accuracy can be set to a low value. Where a pixel has a low DFD value there is a likelihood that the vector is accurate, but no certainty. This relationship can conveniently be obtained by taking the negative exponential of each DFD value and using the result as the probability value.

Other smoothly-varying functions of the DFD could be used to determine the probability values. It is important that probability values are determined over a wide range of input DFD values (including higher DFD values) so as to ensure that vectors are not removed unnecessarily from the process of determining contributions to newly interpolated pixels.

The block (407) uses this principle, but it also analyses the forward and backward DFD values to identify three different probabilities for each pixel of Field A. These are:

The probability that the pixel is part of an object that is visible in both Field P (the preceding field) and Field B (the succeeding field).

This will be referred to as the 'normal' probability.

The probability that the pixel is part of an object that is present in Field P but occluded in Field B. (i.e. an object that is about to be concealed.)

This will be referred to as the 'conceal' probability.

The probability that the pixel is part of an object that is occluded in Field P but visible in Field B. (i.e. an object that has just been revealed.)

This will be referred to as the 'reveal' probability.

The block (407) outputs the set of n 'conceal' probabilities to the motion compensator (415); and, combines the 'normal' and 'reveal' probabilities into a set on n 'other' probabilities which are input to the motion estimator (416). A suitable implementation of this process is shown in FIG. 6, which illustrates the operation of the difference to probability conversion block (407).

Figure 6:
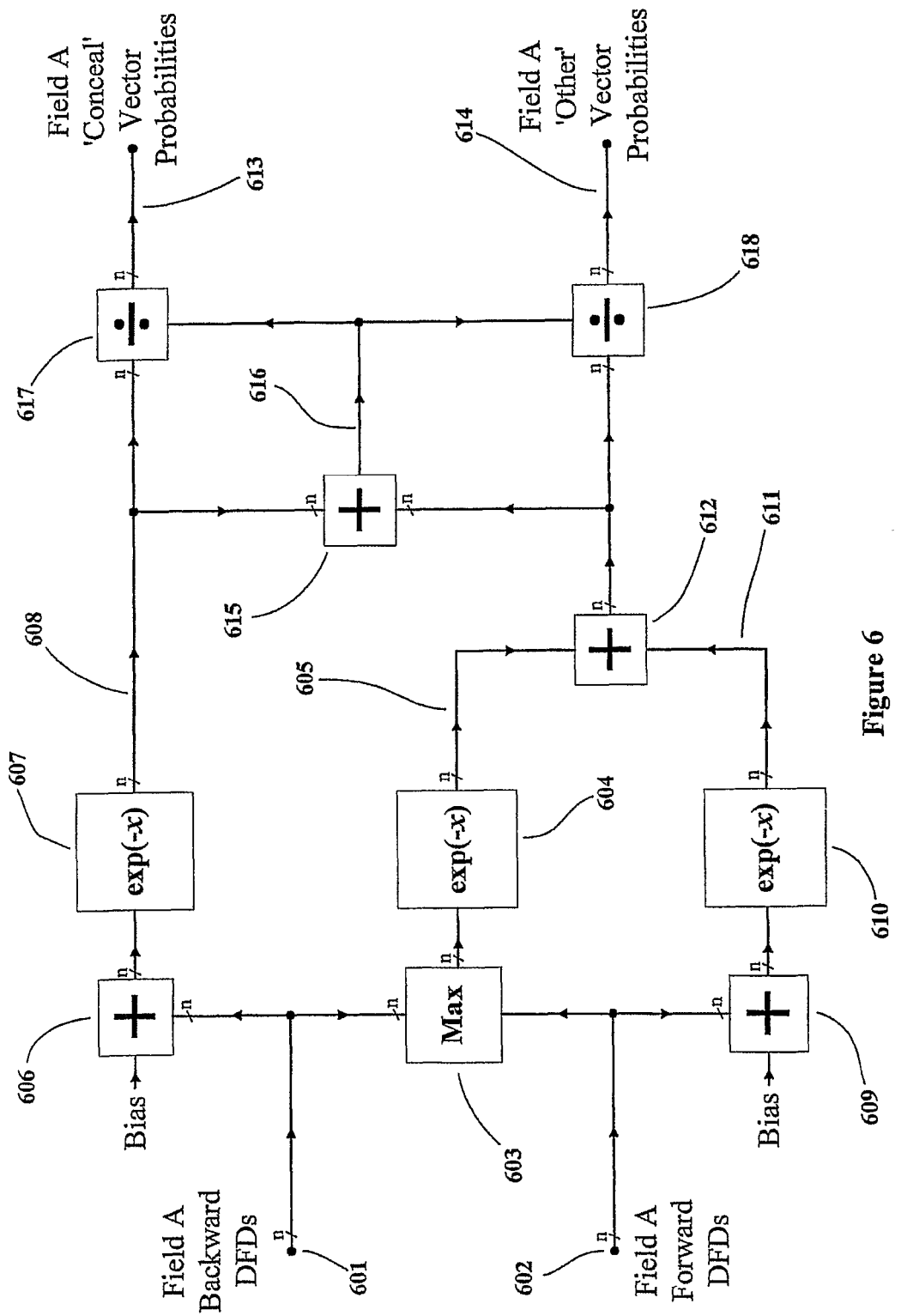
FIG. 6 shows a displaced-field difference to probability conversion system for a preceding field.

Referring to FIG. 6, a set of n 'backward' Field A DFDs (601) (corresponding to the subtraction of Field P from Field A after shifting by each of the n Field A vectors) is combined with a set of n 'forward' Field A DFDs (602) (corresponding to the subtraction of Field B from Field A after shifting by each of the n Field A vectors) in a maximum value determination block (603). The negative exponential of each of the resulting maximum values is calculated by a set of exponentiators (604). The resulting set of n signals (605) represent, for each respective Field A vector, the probability that the vector corresponds to a 'normal' (i.e. neither 'conceal' nor 'reveal') area of Field A. The probability signals (605) are similar to picture signals in which 'light' areas indicate a high probability of an accurate, normal-area vector, and 'dark' areas indicate a low probability.

In 'normal' areas an accurate vector gives low DFDs for both the adjacent fields and so the output of the maximum value block (603) is also a low value, which is converted to a near-unity value by the relevant negative exponentiation block (604).

The set of n backward DFDs (601) is also input to a set of n adders (606) which add a small, constant, positive bias to all the DFDs. The negative exponent of each of the results is taken by a set of exponentiators (607). The resulting set of n signals (608) represent the probabilities that the respective vectors correspond to 'conceal' areas of Field A.

In 'conceal' areas an accurate vector gives a low value for the 'backward' DFD and a high value for the 'forward' DFD. In the system of FIG. 6 only the backward value is used to detect this condition. The bias added in the adders (606) ensures that when both DFDs are small, the input to the block (607) is greater than the input to the block (604) and so the 'normal' probability signal (605) is greater than the 'conceal' probability signal (608). The bias can be considered to represent the unlikeness of 'conceal' areas.

The set of 'forward' DFDs (602) is also input to a set of bias adders (609) and the negative exponents of the results are calculated in a set of exponentiators (610) to give a set of 'reveal' probability signals (611). This process is exactly analogous the derivation of the 'conceal' probabilities (608). The 'reveal' probabilities (611) are added to the 'normal' probabilities (605) in a set of n adders (612). The set of 'conceal' probability signals (608) and set of 'other' probabilities from the adder (612) are used to create outputs at terminals (613) and (614).

The outputs from FIG. 6 (i.e. the outputs from the block (407) in FIG. 4) will represent sets of vector probabilities for the pixels of Field A and as such the total probability for each pixel should be unity. For each pixel an adder (615) sums together the set of probability signals (608) and the set from the adder (612) so as to arrive at a single normalisation coefficient (616) for that pixel. The dividers (617) and (618) divide each member of each of the sets of probability signals applicable to that pixel by the value of the normalisation coefficient (616) prior to their respective output at terminals (613) and (614). These outputs provide the outputs of the difference to probability conversion block (407) of FIG. 4.

The lower half of FIG. 4 shows the processing of the Field B vectors in dependence upon the content of Fields A, B and N so as to obtain probability values for these vectors. This processing is analogous to that described above for the Field A vectors except that the 'reveal' vector probabilities are separately identified (as opposed to the 'conceal' probabilities in the case of the Field A vectors).

The motion compensators (408) and (409) use each of the m vectors relating to Field B to shift the contents of Field A and Field N respectively; and, the sets of subtractors (410) and (411) form Backward and Forward DFDs respectively. These DFDs are non-linearly filtered in the filters (412) and (413) which are identical to the filters (405) and (406). The resulting filtered DFDs are processed in the difference to probability conversion block (414) to obtain 'reveal' and 'other' probabilities for each of the m Field B vectors.

Figure 7:
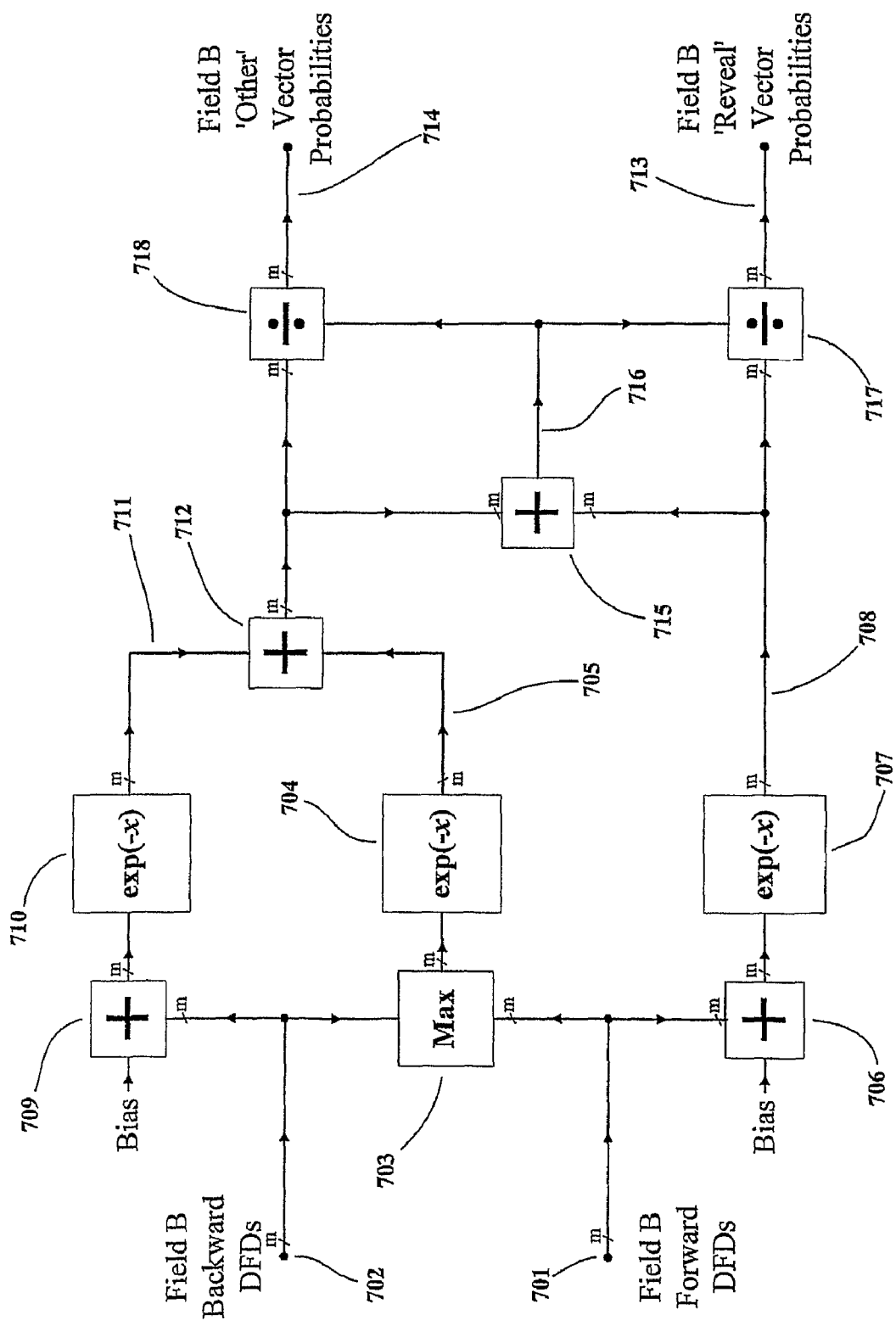
FIG. 7 shows a displaced-field difference to probability conversion system for a succeeding field.

The operation of the difference to probability conversion block (414) is shown in FIG. 7, which can be seen to have some similarity with the processing shown in FIG. 6. Analogous functions in these figures have the same last two digits of their reference numerals.

Referring to FIG. 7 the set of m 'forward' Field B DFDs (701) have a constant bias added in the set of adders (706), the negative exponential of each of the results is taken in the set of exponentiators (707) and the results are normalised in a set of dividers (717) to give a set of m Field B 'reveal' vector probabilities (713). 'Normal' and 'conceal' probabilities are determined, combined, normalised and output as a set of Field B 'other' vector probabilities (714).

Returning to FIG. 4, the four sets of vector probability signals from the difference to probability conversion blocks (407) and (414) are shifted to the positions they would occupy at the time of the new field I. This is done by four sets of motion compensators (415), (416), (417) and (418). These motion compensators shift each probability signal in the direction of the vector to which it refers. The magnitude of the shift is equal to the magnitude of that vector scaled in dependence upon the phase value Φ, which defines the position of the new Field I.

The motion compensators (415) and (416) scale the vector magnitude by Φ so that when the new field is close to Field A the magnitude of the shift is small, and when the new field is close to Field B the shift is close to the full magnitude of the relevant vector.

The motion compensators (417) and (418) scale the vector magnitude by (1−Φ) so that when the new field is close to Field A the magnitude of the shift is close to the full magnitude of the relevant vector, and when the new field is close to Field B the shift is small.

The sets of shifted vector probability signals from the motion compensators (415), (416), (417) and (418) are then processed to limit the contributions of the respective probabilities of 'conceal' and 'reveal' areas in a concealed-area limiting block (419) and a revealed-area limiting block (420). In order to explain the need for these limitation processes it is necessary to return to FIG. 2.

Consider Field B in FIG. 2. The motion vectors relating to this field have been classified, as described above, on the basis of the DFDs relative to Fields A and N. The vectors from the portions (207) and (208) of Field B are classified as 'normal' because these portions are also present in Fields A and N. Portion (206) includes both 'conceal' and 'normal' areas. All these areas are therefore included in the 'other' probabilities for Field B.

The vectors relating to the shaded portions (209) and (210) are classified as 'reveal' because these portions are present in Field N but are not present in Field A. However, it can be seen that the construction of the portion (204) of the new Field I requires the vectors from portion (209) of Field B, but not the vectors from the portion (210) of Field B. This is because the content of the portion (210) is not yet visible in Field I.

The function of the block (420) in FIG. 4 is to lower the Field B probability values relating to the portion (210) which might otherwise cause the appearance of a false transparent trailing edge to the moving foreground object.

A similar situation arises for Field A due to concealment, and this will again be explained with reference to FIG. 2. Vectors relating to the portions (211) and (212) will be 'normal' and vectors relating to portions (213) and (214) will be 'conceal'. Vectors from the portion (213) are useful to construct the portion (203) of the new Field I, but those from the portion (214) are not useful because the portion (214) of Field A is no longer visible in Field I.

The block (419) in FIG. 4 lowers the probabilities of vectors relating to the portion (214) of Field A so as to avoid the appearance of a false transparent leading edge to the moving foreground object.

Figure 8:
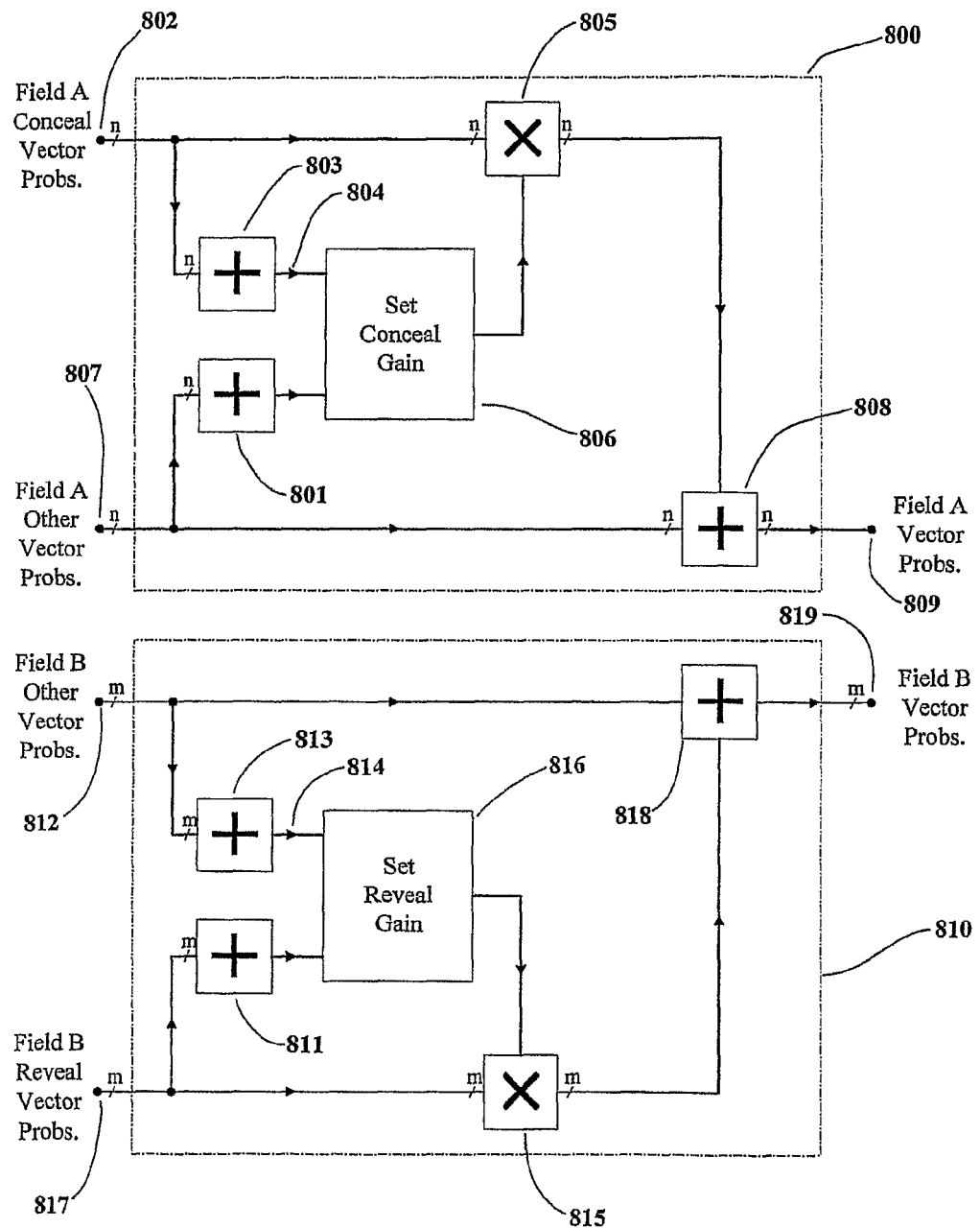
FIG. 8 shows a revealed and concealed area limitation system

The operation of the blocks (419) and (420) is illustrated in FIG. 8. Referring to FIG. 8, the process (800) corresponds to the Field A concealed-area limiting block (419) of FIG. 4. The gain of Field A 'conceal' vector probability signals is reduced for certain pixels by a multiplier (805), whose gain is determined by a concealed-area gain setting block (806). Each of the 'conceal' probabilities from the multiplier (805) is added to its respective 'other' probability (807) (corresponding to the same vector) in an adder (808) and the resulting set of n Field A probabilities (809) corresponds to the set of vector probability signals (307) in FIG. 3.

The concealed-area gain setting block (806) makes use of: the total of the n Field A 'conceal' probability signals from an adder (803), and, the total of the n Field A 'other' probability signals from an adder (801). The individual vector probabilities have previously been shifted to the time of the new field I (by the motion compensators (415) of FIG. 4); this results in the (unwanted) 'conceal' vector probabilities from the portion (214) of Field A (as identified in FIG. 2) being added to the (correct) 'normal' vector probabilities at the leading edge of the moving foreground object. This unusually high total probability is detected and used to control the gain of the multiplier (805).

If the sum of the 'conceal' probabilities from the adder (803) and the total 'other' probability from the adder (801) is greater than unity the multiplier gain is reduced as follows:

The total 'other' probability is subtracted from unity:
If the result of the subtraction is greater than zero the result is divided by the total 'conceal' probability (from the adder (803)) to obtain the gain for the multiplier (805).
If the result of the subtraction is zero, or less than zero, the gain of the multiplier (805) is set to zero.

The effect of this is to ensure that the normalised sum of the set of n Field A probabilities (809) does not exceed unity.

The operation of the Field B revealed-area limiting block (420) of FIG. 4 corresponds to the process (810) of FIG. 8. The gain of each of the set of m Field B 'reveal' vector probability signals is reduced in a multiplier (815), whose gain is determined by a revealed-area gain setting block (816). Each of the gain-adjusted 'reveal' probabilities from the multiplier (815) is added to its respective 'other' probability (812) in an adder (818) and the resulting set of m Field B probabilities (819) corresponds to the set of vector probability signals (307) in FIG. 3.

The revealed-area gain setting block (816) operates in a similar way to the block (806) to detect the 'excess' vector probabilities from the portion (210) of Field B (as identified in FIG. 2) to ensure that the normalised sum of the set of m Field B probabilities (819) does not exceed unity.

As can be seen from the above description, the newly interpolated image is constructed from existing images in dependence upon motion vectors resulting from motion measurement between the existing images; it is therefore important that vector information is available for every pixel of the original images that are used to construct the new image. This can be ensured by including a 'global' vector (applicable to every pixel) in each set of vectors. A 'zero' global vector could be included; where there is no motion, this vector will give low DFDs and its probability will be rated as high.

It is also necessary to limit the use of vectors to the regions for which they were computed. This can be done by 'blanking' the probability signals derived for each vector so that these signals are set to zero for pixels for which the motion measurement is not relevant. This requirement is less onerous if the respective regions associated with the vectors are not too small.

In the above-described example of the invention it was assumed that the contributing input pixels and their associated DFDs are simultaneously available for the construction of the output pixels—i.e. information relating to several input pixels is read from storage in parallel to create the output. It is equally possible to implement the invention by 'write side' processing where each contribution from each input pixel to the output pixels is determined and stored ('written') as soon as the relevant information is available. In this case each output image will result from the accumulation of all the contributions, and constituent output pixels may be 'written to' more than once.

It should also be noted that where the resolution of the motion compensation (image shifting) is less than one pixel, one contribution to the output (due to one input pixel and one associated vector probability) may affect more than one pixel in the output image; i.e. all the pixels within the aperture of the sub-pixel interpolation filter will receive a contribution.

In the above-described interpolation system the absence of occlusion is separately detected for Field A and for Field B. In each case the forward and backward DFDs for the relevant field are combined (in the maximum function (603) or (703)) and the lack of occlusion is assumed when both relevant DFDs are small. Each of these determinations involves three fields: Fields P, A and B for Field A; and Fields A, B and N for Field B.

However, the absence of occlusion can also be detected by examining the DFD between the appropriate "outer fields": fields P and B for Field A; and fields A and N for field B. This alternative method only involves two fields and will therefore be less affected by noise than the combination of information from three fields.

Figure 9:
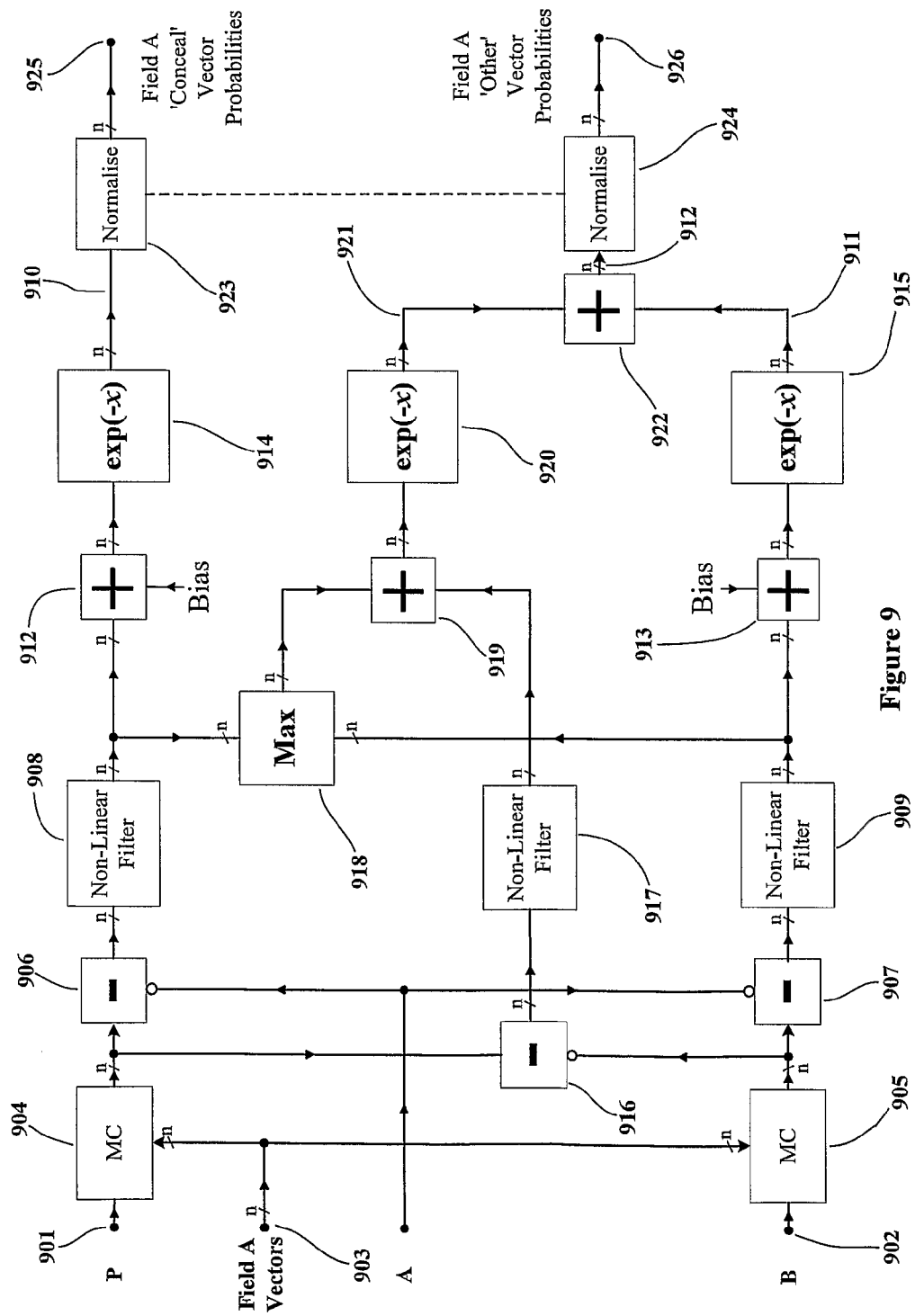
FIG. 9 shows a system to obtain 'conceal' and 'other' probabilities for Field A vectors.

A system using this principle, to obtain 'conceal' and 'other' probabilities for Field A vectors, is shown in FIG. 9.

The fields adjacent to Field A, Field P (901) and Field B (902), are shifted by the Field A vectors (903) in respective motion compensators (904) and (905), and forward and backward DFDs are formed in subtractors (906) and (907). The DFDs are rectified and non-linearly filtered in non-linear filters (908) and (909). The results are converted to 'conceal' probabilities (910) and 'reveal' probabilities (911) by respective bias adders (912) and (913), and exponentiators (914) and (915). These processes are identical to the system of FIG. 4.

A set of DFDs between fields P and B is formed by the subtractor (916), and this is non-linearly filtered and rectified in the non-linear filter (917). The resulting signals will be small when the changes between Field P and Field B result only from the motion described by the motion vectors, and not from occlusion. These signals could be converted to 'normal' probability signals, by taking their negative exponents. However, it is helpful also to make use of the information from the forward and backward DFDs relative to Field A, and so the set of maximum values of these DFDs from the maximum function (918) is added, in the adder (919), to the set of outputs from the non-linear filter (917). The negative exponentials of the sums are formed in the exponentiator (920) so as to form a set of 'normal' probability signals (921). These 'normal' probabilities are added to the respective 'reveal' probabilities (911) in the adder (922) to form a set of 'other' probabilities (912). The two sets of vector probabilities (910) and (912) are normalised in normalisation functions (923) and (924) and output as sets of 'conceal' probabilities (925) and 'other' probabilities (926). The normalisation functions (923) and (924) operate together so as to ensure that the total probabilities for each pixel sum to unity, in the same way as in the system of FIG. 6.

Figure 10:
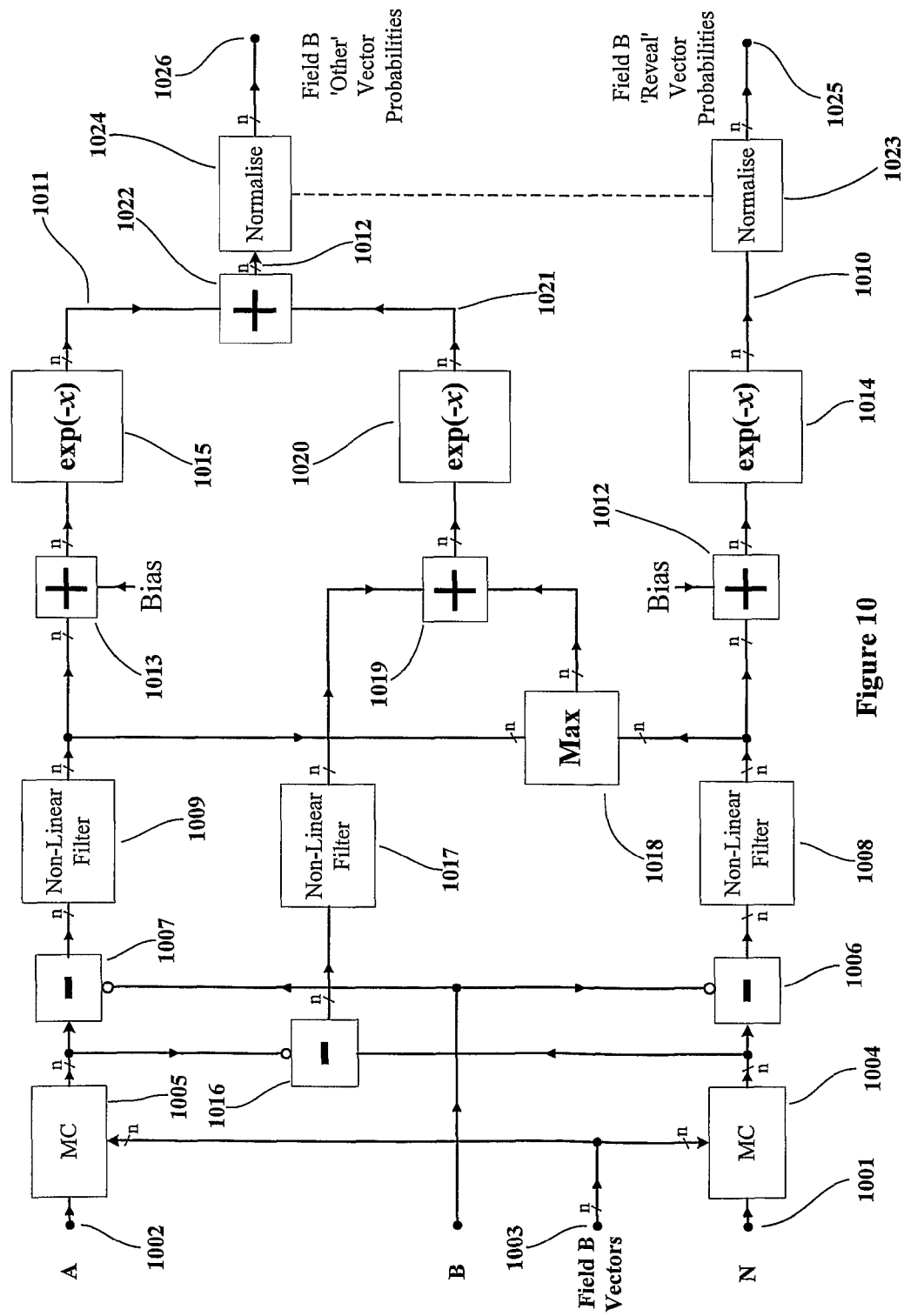
FIG. 10 shows a system to obtain 'reveal' and 'other' probabilities for Field B vectors.

An analogous system for determining the sets of Field B vectors is shown in FIG. 10. Reference numerals for the equivalent elements of this figure are identical to those of FIG. 9 apart from the initial digits, where 10 replaces 9.

Other methods of combining the forward, backward and outer DFDs may be used; for example a weighted sum, or some other non-linear combination. And, as mentioned previously, functions other than a negative exponential can be used to convert the vector DFD values to vector probability values.

Other variations within the described inventive concept are possible. For example, some motion measurement processes may provide a 'confidence' value associated with each motion vector (for example the height of a peak in a correlation surface) and this may also be used in deriving the probability values associated with the relevant vector.

A streaming, real-time process has been assumed in the above description and the skilled person will understand that the invention can be applied to files or stored image data in which there is greater flexibility in the timing of the processing steps, and so the timing of the processing can be unrelated to the intended timing of the display or acquisition of the images. It is also possible for more than two images, or only one image, to be used to construct the new interpolated image. Not all the above-described steps need be included, for example the cross-fader could be controlled directly by Φ and the modification of the fade parameter in dependence of total probabilities omitted.

The invention may be implemented in hardware or in software as will be apparent to a skilled person.

The invention claimed is:

1. A method of interpolating in a processor a new image at an output position between first and second existing images within an existing sequence of related images, comprising the steps of:
    determining motion vectors associated with pixels or regions of pixels of the first existing image in the sequence;
    shifting pixels of the existing image to the output position in accordance with the or each motion vector associated therewith;
    determining at least two probability of accuracy measures for each of a plurality of the said motion vectors: a first measure describing the probability that the respective associated pixel is newly revealed in the said first image of the sequence; and, a second measure describing the probability that the respective associated pixel is about to be concealed in the said first image of the sequence;
    forming a weighted sum of the said shifted pixels where the weight for each pixel is proportional to a combination of the probability of accuracy measures for its respective associated motion vectors; and
    creating said new image by addition of the said weighted sum of shifted pixels to a second sum of weighted shifted pixels derived from the second existing image in the sequence.

2. A method according to claim 1 in which a pixel from an existing image can contribute to two or more positions in the new image.

3. A method according to claim 1 in which the said probability of accuracy measure is derived from one or more displaced-field differences between the contributing existing image and one or more adjacent existing images.

4. A method according to claim 1 in which the said probability of accuracy measure is determined using a smooth function of a filtered displaced-field difference.

5. A method according to claim 4 in which the filtered displaced-field difference is formed from a weighted sum of a rectified displaced-field difference and an amplitude-limited, spatially low-pass filtered, rectified displaced-field difference.

6. A method according to claim 4 in which the smooth function is a negative exponential.

7. A method according to claim 1 in which the total probability of the contributions from the preceding existing field to a new image pixel is evaluated and the contribution of about-to-be-concealed pixels is reduced so that the said total does not exceed a threshold.

8. A method according to claim 1 in which the total probability of the contributions from the succeeding existing field to a new image pixel is evaluated and the contribution of newly-revealed pixels is reduced so that the said total does not exceed a threshold.

9. Apparatus for interpolating a new image at an output position between first and second existing images within an existing sequence of related images, comprising:
 a motion vector input for receiving first motion vectors associated with pixels or regions of pixels of said first existing image and second motion vectors associated with pixels or regions of pixels of said second existing image;
 a first vector probability determinator for determining for each of said first motion vectors a first probability of accuracy measure describing the probability that the respective associated pixel is newly revealed in the said first image of the sequence and a second probability of accuracy measure describing the probability that the respective associated pixel is about to be concealed in the said first image of the sequence;
 a second vector probability determinator for determining for each of said second motion vectors a first probability of accuracy measure describing the probability that the respective associated pixel is newly revealed in the said first image of the sequence and a second probability of accuracy measure describing the probability that the respective associated pixel is about to be concealed in the said first image of the sequence;
 a first motion compensator for shifting pixels of the first existing image to the output position in accordance with the or each motion vector associated therewith;
 a second motion compensator for shifting pixels of the second existing image to the output position in accordance with the or each motion vector associated therewith;
 a first summer for forming a first weighted sum of the said shifted pixels from said first motion compensator where the weight for each pixel is proportional to a combination of said probability of accuracy measures for its respective associated motion vectors;
 a second summer for forming a second weighted sum of the said shifted pixels from said second motion compensator where the weight for each pixel is proportional to a combination of said probability of accuracy measures for its respective associated motion vectors; and
 a combiner for combining shifted picture information to form said new image depending on the probability of accuracy measure for the respective motion vector by addition of said first weighted sum of shifted pixels to said second sum of weighted shifted pixels.

10. A method of interpolating a new image in a processor at an output position within an existing sequence of related images, wherein a plurality of respective motion vectors for an input pixel are used to determine a plurality of respective contributions from that input pixel to the said new image, comprising the steps of:
 determining motion vectors associated with pixels or regions of pixels of a first existing image in the sequence;
 shifting pixels of the said first existing image to the said output position in accordance with the or each motion vector associated therewith;
 determining at least two respective probability of accuracy measures for each of a plurality of the said motion vectors: a first probability of accuracy measure that is a function of a displaced-field difference between the pixel associated with the said vector and a corresponding pixel in the preceding image in the sequence; and a second probability of accuracy measure that is a function of a displaced-field difference between the pixel associated with the said vector and a corresponding pixel in the succeeding image in the sequence;
 forming a weighted sum of the said shifted pixels where the weight for each pixel is proportional to a combination of the probability of accuracy measures for its respective associated motion vectors; and
 creating said new image by the addition of the said weighted sum of shifted pixels to a second sum of weighted shifted pixels derived from a second existing image in the sequence.

11. A method according to claim 10 where the said addition is weighted in proportion to the proximity of the position in the sequence of the new interpolated image to the said first and second existing images respectively.

12. A method according to claim 10 in which the said addition is weighted in dependence on the ratio of the total probabilities of vectors applicable to the pixel from the said first image in the sequence to the total probabilities of vectors applicable to the pixel from the said second image in the sequence.

13. A method according to claim 10 where a smooth function of a displaced-field difference contributes to the said probability of accuracy measure.

14. A method according to claim 13 in which the said smooth function is a negative exponential.

15. A method according to claim 10 where the said displaced-field difference is spatially filtered.

16. A method according to claim 15 in which the filtered displaced-field difference is formed from a weighted sum of a rectified displaced-field difference and an amplitude-limited, spatially low-pass filtered, rectified displaced-field difference.

17. Apparatus for interpolating a new image at an output position between first and second existing images within an existing sequence of related images, comprising:
 a motion vector input for receiving first motion vectors associated with pixels or regions of pixels of said first existing image and second motion vectors associated with pixels or regions of pixels of said second existing image;
 a first vector probability determinator for determining for each of said first motion vectors a first probability of accuracy measure that is a function of a displaced-field difference between the pixel associated with the said vector and a corresponding pixel in the preceding image in the sequence; and a second probability of accuracy measure that is a function of a displaced-field difference between the pixel associated with the said vector and a corresponding pixel in the succeeding image in the sequence;
 a second vector probability determinator for determining for each of said second motion vectors a first probability of accuracy measure that is a function of a displaced-field difference between the pixel associated with the said vector and a corresponding pixel in the preceding image in the sequence; and a second probability of accuracy measure that is a function of a displaced-field difference between the pixel associated with the said vector and a corresponding pixel in the succeeding image in the sequence;
 a first motion compensator for shifting pixels of the first existing image to the output position in accordance with the or each motion vector associated therewith;

a second motion compensator for shifting pixels of the second existing image to the output position in accordance with the or each motion vector associated therewith;

a first summer for forming a first weighted sum of the said shifted pixels from said first motion compensator where the weight for each pixel is proportional to a combination of said probability of accuracy measures for its respective associated motion vectors;

a second summer for forming a second weighted sum of the said shifted pixels from said second motion compensator where the weight for each pixel is proportional to a combination of said probability of accuracy measures for its respective associated motion vectors; and a combiner for combining shifted picture information to form said new image depending on the probability of accuracy measure for the respective motion vector by addition of said first weighted sum of shifted pixels to said second sum of weighted shifted pixels.

18. A non-transitory computer readable medium causing a computer program containing instructions for the implementation of a method of interpolating in an image interpolator a new image at an output position between first and second existing images within an existing sequence of related images, comprising the steps of:

determining motion vectors associated with pixels or regions of pixels of the first existing image in the sequence;

shifting pixels of the existing image to the output position in accordance with the or each motion vector associated therewith;

determining at least two probability of accuracy measures for each of a plurality of the said motion vectors: a first measure describing the probability that the respective associated pixel is newly revealed in the said first image of the sequence; and, a second measure describing the probability that the respective associated pixel is about to be concealed in the said first image of the sequence;

forming a weighted sum of the said shifted pixels where the weight for each pixel is proportional to a combination of the probability of accuracy measures for its respective associated motion vectors; and creating said new image by addition of the said weighted sum of shifted pixels to a second sum of weighted shifted pixels derived from the second existing image in the sequence.

19. A computer program product according to claim 18 in which a pixel from an existing image can contribute to two or more positions in the new image.

20. A computer program product according to claim 18 in which the said probability of accuracy measure is derived from one or more displaced-field differences between the contributing existing image and one or more adjacent existing images.

21. A computer program product according to claim 18 in which the said probability of accuracy measure is determined using a smooth function of a filtered displaced-field difference.

22. A computer program product according to claim 21 in which the filtered displaced-field difference is formed from a weighted sum of a rectified displaced-field difference and an amplitude-limited, spatially low-pass filtered, rectified displaced-field difference.

23. A computer program product according to claim 21 in which the smooth function is a negative exponential.

24. A computer program product according to claim 18 in which the total probability of the contributions from the preceding existing field to a new image pixel is evaluated and the contribution of about-to-be-concealed pixels is reduced so that the said total does not exceed a threshold.

25. A computer program product according to claim 18 in which the total probability of the contributions from the succeeding existing field to a new image pixel is evaluated and the contribution of newly-revealed pixels is reduced so that the said total does not exceed a threshold.

26. A non-transitory computer program product containing instructions for the implementation of a method of interpolating a new image in an image interpolator at an output position within an existing sequence of related images, wherein a plurality of respective motion vectors for an input pixel are used to determine a plurality of respective contributions from that input pixel to the said new image, comprising the steps of:

determining motion vectors associated with pixels or regions of pixels of a first existing image in the sequence;

shifting pixels of the said first existing image to the said output position in accordance with the or each motion vector associated therewith;

determining at least two respective probability of accuracy measures for each of a plurality of the said motion vectors: a first probability of accuracy measure that is a function of a displaced-field difference between the pixel associated with the said vector and a corresponding pixel in the preceding image in the sequence; and a second probability of accuracy measure that is a function of a displaced-field difference between the pixel associated with the said vector and a corresponding pixel in the succeeding image in the sequence;

forming a weighted sum of the said shifted pixels where the weight for each pixel is proportional to a combination of the probability of accuracy measures for its respective associated motion vectors; and creating said new image by the addition of the said weighted sum of shifted pixels to a second sum of weighted shifted pixels derived from a second existing image in the sequence.

27. A computer program product according to claim 26 where the said addition is weighted in proportion to the proximity of the position in the sequence of the new interpolated image to the said first and second existing images respectively.

28. A computer program product according to claim 26 in which the said addition is weighted in dependence on the ratio of the total probabilities of vectors applicable to the pixel from the said first image in the sequence to the total probabilities of vectors applicable to the pixel from the said second image in the sequence.

29. A method according to claim 26 where a smooth function of a displaced-field difference contributes to the said probability of accuracy measure.

30. A method according to claim 26 in which the said smooth function is a negative exponential.

31. A method according to claim 26 where the said displaced-field difference is spatially filtered.

32. A method according to claim 31 in which the filtered displaced-field difference is formed from a weighted sum of a rectified displaced-field difference and an amplitude-limited, spatially low-pass filtered, rectified displaced-field difference.

* * * * *

UNITED STATES PATENT AND TRADEMARK OFFICE
CERTIFICATE OF CORRECTION

PATENT NO.       : 8,358,878 B2                                                                 Page 1 of 1
APPLICATION NO.  : 12/375543
DATED            : January 22, 2013
INVENTOR(S)      : Martin Weston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 961 days.

Signed and Sealed this

First Day of September, 2015

Michelle K. Lee
*Director of the United States Patent and Trademark Office*